United States Patent
Co et al.

(10) Patent No.: US 11,200,366 B2
(45) Date of Patent: Dec. 14, 2021

(54) USING CLASSIFICATIONS FROM TEXT TO DETERMINE INSTANCES OF GRAPHICAL ELEMENT TYPES TO INCLUDE IN A TEMPLATE LAYOUT FOR DIGITAL MEDIA OUTPUT

(71) Applicant: INTERNATIONAL BUSINESS MACHINES CORPORATION, Armonk, NY (US)

(72) Inventors: Hau Co, Sharon (CA); Joseph Lam, Markham (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/716,410

(22) Filed: Dec. 16, 2019

(65) Prior Publication Data
US 2021/0182468 A1    Jun. 17, 2021

(51) Int. Cl.
| | | |
|---|---|---|
| G06F 40/109 | (2020.01) | |
| G06F 9/451 | (2018.01) | |
| G06N 20/00 | (2019.01) | |
| G06F 40/295 | (2020.01) | |
| G06F 3/0481 | (2013.01) | |
| G06F 40/30 | (2020.01) | |
| G06F 3/0484 | (2013.01) | |

(52) U.S. Cl.
CPC .......... *G06F 40/109* (2020.01); *G06F 3/0484* (2013.01); *G06F 3/04817* (2013.01); *G06F 9/451* (2018.02); *G06F 40/295* (2020.01); *G06F 40/30* (2020.01); *G06N 20/00* (2019.01)

(58) Field of Classification Search
CPC ...... G06F 40/109; G06F 9/451; G06F 40/295; G06F 40/30; G06F 3/04817; G06F 3/0484; G06N 20/00
USPC ......................................................... 715/243
See application file for complete search history.

(56) References Cited

U.S. PATENT DOCUMENTS

| | | | |
|---|---|---|---|
| 8,819,541 B2 * | 8/2014 | Nicholas ............... | G06F 40/143 |
| | | | 715/236 |
| 8,990,684 B2 | 3/2015 | Gao et al. | |
| 9,484,006 B2 | 11/2016 | Konnola et al. | |
| 9,678,949 B2 * | 6/2017 | Monk, II ................ | G06F 40/30 |
| 10,839,033 B1 * | 11/2020 | Fabbrizio ............... | G06N 3/049 |
| 11,044,513 B2 * | 6/2021 | Ade .................. | H04N 21/85406 |
| 2010/0088605 A1 | 4/2010 | Livshin et al. | |
| 2014/0006942 A1 | 1/2014 | Pearcy et al. | |

(Continued)

*Primary Examiner* — William D Titcomb
(74) *Attorney, Agent, or Firm* — Konrad Raynes Davda & Victor LLP; David W. Victor

(57) ABSTRACT

Provided are a computer program product, system, and method for using classifications from text to determine instances of graphical element types to include in a template layout for digital media output. Text is processed to determine classifications. The determined classifications of the text are inputted to a machine learning module to output instances for graphical element types. The outputted instances of the graphical element types are rendered in a user interface for a user to select. User selection is received of one of the instances rendered in the user interface for each of the graphical element types. The text with the user selected instances for the graphical element types are rendered in a template layout. The template layout including the text rendered with the user selected instances for the graphical element types is rendered in an output layout of digital media.

20 Claims, 5 Drawing Sheets

(56) References Cited

U.S. PATENT DOCUMENTS

| | | |
|---|---|---|
| 2014/0258817 A1 | 9/2014 | Carrier et al. |
| 2015/0058764 A1* | 2/2015 | Moran .................. G06F 3/0484 |
| | | 715/765 |
| 2015/0066479 A1* | 3/2015 | Pasupalak ............... G10L 15/30 |
| | | 704/9 |
| 2015/0100882 A1 | 4/2015 | Severenuk et al. |
| 2015/0112980 A1 | 4/2015 | Sanio et al. |
| 2015/0121210 A1 | 4/2015 | Mangalam |
| 2015/0310344 A1* | 10/2015 | Gunjan .................... G06N 5/04 |
| | | 706/52 |
| 2016/0093080 A1 | 3/2016 | Tumanov et al. |
| 2017/0032269 A1* | 2/2017 | Portilla .................. G06N 7/005 |
| 2017/0078621 A1* | 3/2017 | Sahay .................. H04N 21/854 |
| 2017/0083817 A1* | 3/2017 | Di Sciullo ............. G06N 5/022 |
| 2018/0018349 A1 | 1/2018 | Liu et al. |
| 2018/0143741 A1* | 5/2018 | Uriostegui ............. G06F 40/30 |
| 2020/0160458 A1* | 5/2020 | Bodin .................. G06F 11/302 |

\* cited by examiner

Graphical Element Training Set

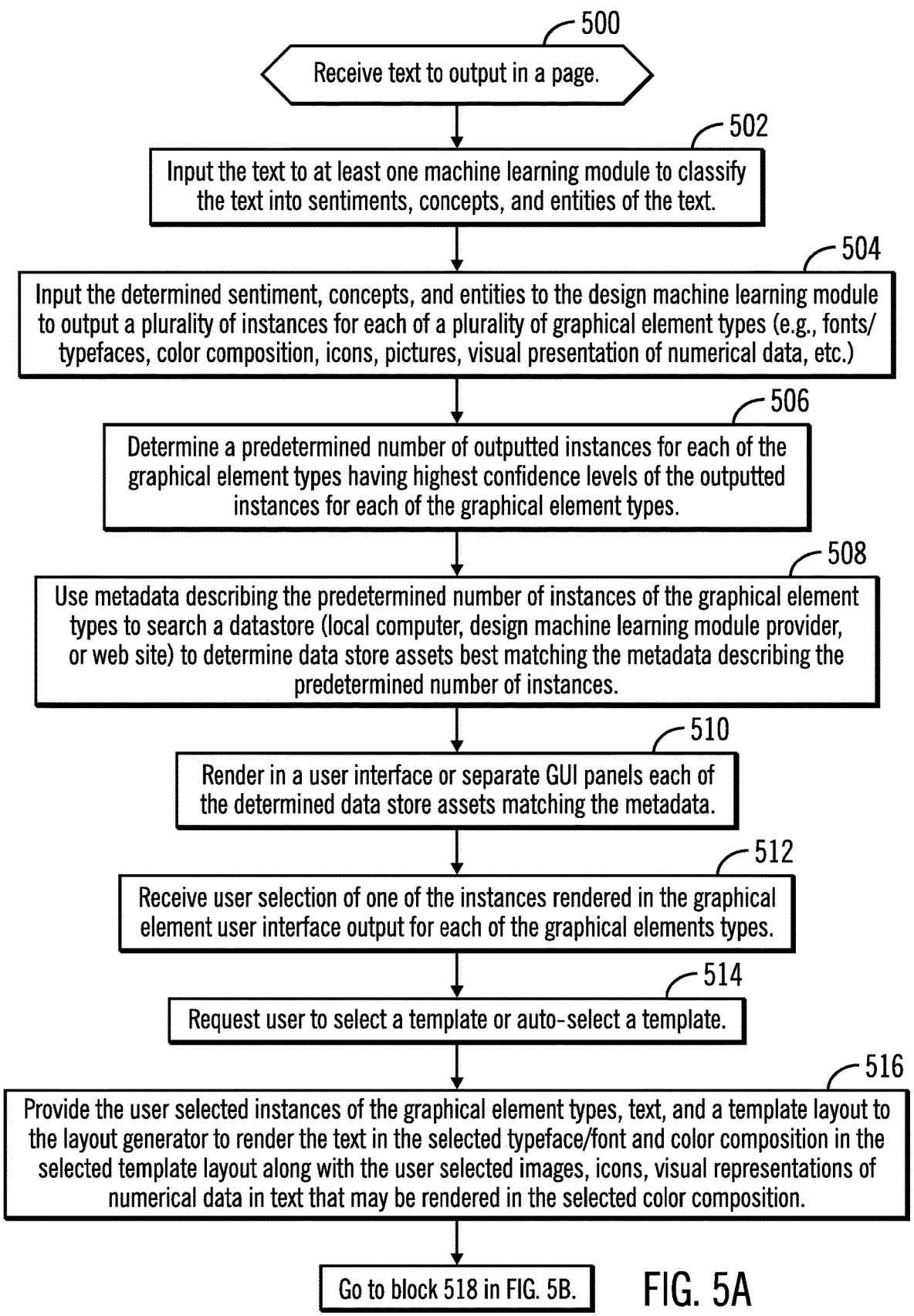

USING CLASSIFICATIONS FROM TEXT TO DETERMINE INSTANCES OF GRAPHICAL ELEMENT TYPES TO INCLUDE IN A TEMPLATE LAYOUT FOR DIGITAL MEDIA OUTPUT

BACKGROUND OF THE INVENTION

1. Field of the Invention

The present invention relates to a computer program product, system, and method for using classifications from text to determine instances of graphical element types to include in a template layout for digital media output.

2. Description of the Related Art

Design of web pages and other digital media content is an art form that requires years of training and experience to perfect. Having access to great designers and design expertise is inaccessible to many people and businesses trying to design a presentation for content to be rendered in digital or other media, such as a web page, email, document etc. Computer users designing a presentation of content may use programs that provide layout templates in which to include content and editing tools to modify the presentation of content and add images, icons, colors and other features. Often most users designing content for digital media lack the expertise to select design elements most suitable for the context of the page being designed.

There is a need in the art for developing improved techniques for selecting instances of graphical element types to render text in a template for generating into a page of digital media content.

SUMMARY

Provided are a computer program product, system, and method for using classifications from text to determine instances of graphical element types to include in a template layout for digital media output. Text is processed to determine classifications. The determined classifications of the text are inputted to a machine learning module to output instances for graphical element types. The outputted instances of the graphical element types are rendered in a user interface for a user to select. User selection is received of one of the instances rendered in the user interface for each of the graphical element types. The text with the user selected instances for the graphical element types are rendered in a template layout. The template layout including the text rendered with the user selected instances for the graphical element types is rendered in an output layout of digital media.

BRIEF DESCRIPTION OF THE DRAWINGS

FIGS. 5A and 5b illustrate an embodiment of operations to process received text to determine instances of graphical element types based on classifications of the received text to use to render the received text in a template layout.

DETAILED DESCRIPTION

Described embodiments provide improvements to computer technology for designing a template layout for content. The described embodiments provide a machine learning module to determine instances of graphical element types to use to render text in a template layout for digital media output that incorporates design expertise and proper design choices based on the context and classifications of the text to render. Described embodiments provide machine learning modules to recommend styling and appearance of graphic elements such as typeface/font, color, images (photography and illustration), symbols, look and feel, and tone, that is relevant to the provided text. Described embodiments provide instances of graphical elements that optimize the presentation of the text in a template layout based on known design concepts and principles. Further, the machine learning module used to determine the design choices for the text may be continually trained and adjusted using training sets incorporating design choices based on recognized design expertise and user specific selections of instances of graphical element types for text having determined classifications, such as context, emotions, entities, etc.

Figure 1:
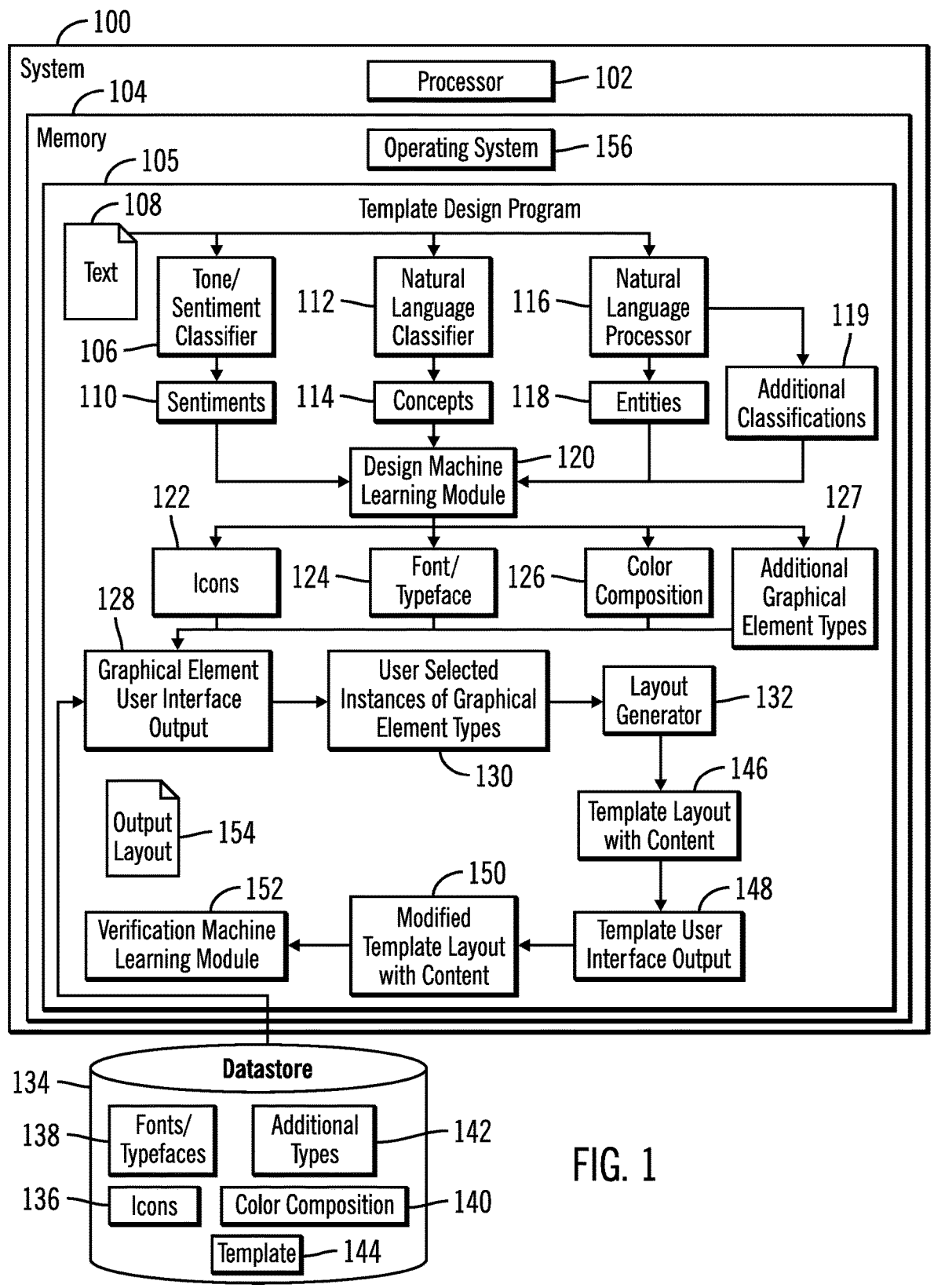
FIG. 1 illustrates an embodiment of a system for designing a template layout to present received text.

FIG. 1 illustrates an embodiment of a computer system 100 in which embodiments are implemented. The system 100 includes a processor 102 and a main memory 104. The main memory 104 may include a template design program 105 that includes various program components to generate a template layout for input text 108, and includes a tone/sentiment classifier 106 that uses linguistic analysis to detect emotional and language tones in received input text 108 and classify the text 108 as one or more sentiments 110, or tones, feelings, etc.; a natural language classifier 112 that is trained to process the text 108 to classify into one or more concepts 114 and categories included in the text 108; and a natural language processor (NLP) 116 to determine entities 118 mentioned in the text 108, such as entity classification. The NLP 116 or other component 106 and 112 may generate additional classifications 119, such as semantic features of text, including categories, concepts, emotion, entities, keywords, metadata, relations, semantic roles, and sentiment.

The generated sentiments 110, concepts 114, and entities 118 may be inputted to a design machine learning module 120 that generates instances of graphical element types to generate into a template, shown as icons 122, fonts/typefaces 124, color composition 126, and additional graphical element types 127 in which to render the text 108. The additional graphical element types 127 may include images, graphical representations of numerical data in the text 108 and other design elements that may be included. The outputted instances of graphical elements 122, 124, 126, 127 may comprise descriptors or identifiers of the instances that are used to access the graphical element types to render the template being designed. Descriptions of the determined instances of graphical element types 122, 124, 126, 127 are used to search a datastore 134 to determine available and accessible assets of icons 136, fonts/typefaces 138, color composition 140, and any other graphical element types 142 (such as images, etc.) in the datastore 134. The determined available assets 136, 138, 140, and 142 are rendered as a selectable list in graphical element user interface output 128 which when rendered in a user interface display allows the user to select one of the instances for each of the graphical element types, such as select a set of icons, font/typefaces, color composition, images, visual representation of numerical information in the text 108, etc. The user selected instances of graphical element types 130 are provided to a layout generator 132. The layout generator 132 may prompt the user through the user interface 128 to select a template of the templates 144 in the data store 134 or automatically select a template 144. The layout generator 132 uses the user selected instances 130, such as selected icons 136, typefaces 138, color composition 140, visual representations of numerical data, and additional types 142, to render the text 108 in the selected template layout 144. The template layout 144 may be selected by the user or the layout generator 132 using a template 144 that best matches the sentiments 110, concepts 114 entities 118, and additional classifications 119 in the text 108.

The layout generator 132 generates a template layout with content 146 that is rendered in template user interface output 148 to render on a display panel for the user to accept the generated template layout 144 or modify in the user interface 148 to produce a modified template layout content 150. The user may modify the template layout 146 in the user interface 148 to produce the modified template layout with content 150 by moving content, such as the text 108, rendered accessed images 138 or icons 140 to different frames or changing the color composition 126. The modified template layout with content 150 is provided to a verification machine learning module 152 to determine based on the classifications of the text 108, e.g., sentiments 110, concepts 114 and entities 118, and the text 108 whether the modified template layout with content 150 is acceptable given the concepts 114 and sentiments 110 of the document with a threshold degree of confidence.

The template design program 105 may generate a final output layout 154 with the template layout with content 146 generated by the layout generator 132 or verified modified template layout with content 150 in a digital media format for rendering in a program or user interface, such as a web page in Hypertext Markup Language (HTML), extended markup language (XML), an image, a document, etc.). Additionally, the output layout 154 may be transmitted to a printing device to generate to generate print media, such as posters, billboards, flyer, advertisement, direct mail, etc.

The datastore 134 may include graphical element types 136, 138, 140, 142 and templates 144 in a local system 100 of the user, provided by the developer of the template design program 105, or be accessed from such components available on web sites over the internet.

The tone/sentiment classifier 106 may comprise the IBM Watson™ Tone Analyzer, or other tone analyzers, that can analyze tones and emotions of what people write. The natural language classifier 112 and natural language processor (NLP) 116 may comprise the IBM Watson™ Natural Language Classifier and/or the Watson™ Natural Language Understanding (NLU) modules that can analyze semantic features of text, including categories, concepts, emotion, entities, keywords, metadata, relations, semantic roles, and sentiment. (IBM and Watson are trademarks of International Business Machines Corporation throughout the world). The components 106, 112, and 116 may comprise separate machine learning modules, where each module produces one of sentiments, concepts, and entities or be distributed in two or more machine learning modules. There may be additional classifiers, such as a natural language understanding (NLU) module to provide further classifications, or the operations of such additional classifiers, such as the NLU, may be included in the NLP 116.

The verification machine learning module 152 may use visual recognition software, such as IBM's Watson Visual Recognition, to provide insight into the visual content and design composition of the user modified template layout 150 to verify the user modified template 150. Further, the layout generator 132 may use visual recognition software to organize the information and provide understanding of content being generated in the template layout 146 that is lacking metadata.

The main memory 104 may further include an operating system 156 to manage the system operations and flow of operations among the components 105, 106, 112, 116, 120, 132, 152 and generate the output 128, 148, 154.

The memory 104 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAM), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowire-based non-volatile memory, magnetoresistive random-access memory (MRAM), and other electrically erasable programmable read only memory (EEPROM) type devices, hard disk drives, removable memory/storage devices, etc.

In one embodiment, the template design program 105 may be deployed at different end user systems to generate template layouts for the users. In an alternative embodiment, the template design program 105 may be implemented as a cloud service, such as a Software as a Service (SaaS) provider, that provides user access to the template design program 105 over a network or the Internet to generate the output layout 154 that is transmitted over the network to the user computer.

Generally, program modules, such as the program components 105, 106, 112, 116, 120, 132, 152, etc., may comprise routines, programs, objects, components, logic, data structures, and so on that perform particular tasks or implement particular abstract data types. The program modules may be practiced in distributed cloud computing environments where tasks are performed by remote processing devices that are linked through a communications network. In a distributed cloud computing environment, program modules may be located in both local and remote computer system storage media including memory storage devices.

Figure 2:
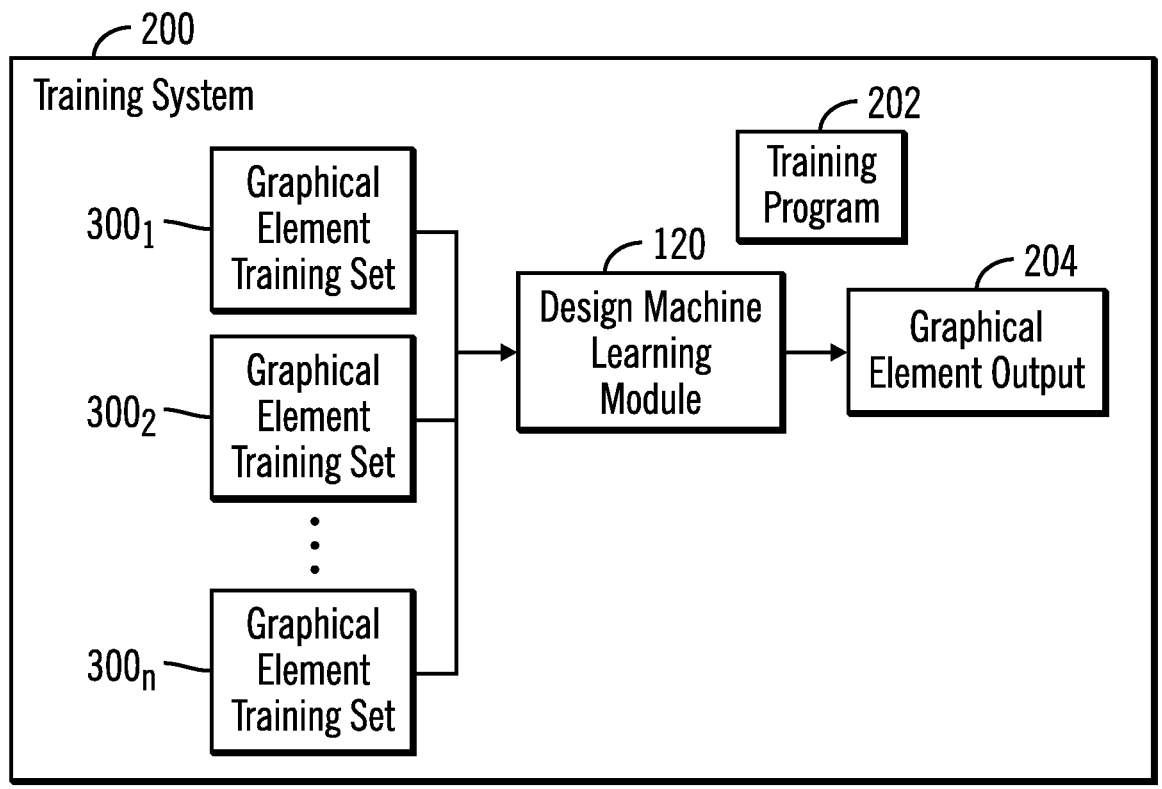
FIG. 2 illustrates an embodiment of a system to train a design learning module to produce instances of graphical element types to include in a template layout for received text.
Figure 3:
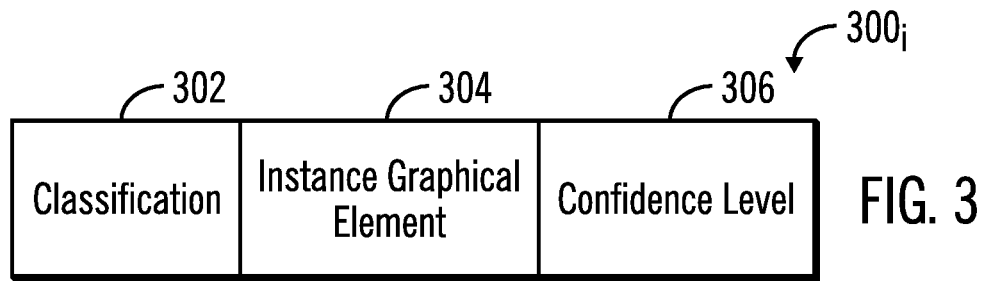
FIG. 3 illustrates an embodiment of an instance of a graphical element training set.

The program components and hardware devices of the systems 100 and 200 of FIGS. 1 and 2 may be implemented in one or more computer systems, where if they are implemented in multiple computer systems, then the computer systems may communicate over a network.

The program components 105, 106, 112, 116, 120, 132, 152 may be accessed by the processor 102 from the memory 104 to execute. Alternatively, some or all of the program components 105, 106, 112, 116, 120, 132, 152 may be implemented in separate hardware devices, such as Application Specific Integrated Circuit (ASIC) hardware devices.

The functions described as performed by the program components 105, 106, 112, 116, 120, 132, 152 may be implemented as program code in fewer program modules than shown or implemented as program code throughout a greater number of program modules than shown.

Certain of the components, such as 105, 106, 112, 116, 120, 132, 152, may use machine learning and deep learning algorithms to process text to produce the specified output and may comprise machine learning modules, such as artificial neural network programs. A neural network may be trained using backward propagation to adjust weights and biases at nodes in a hidden layer to produce a desired/correct categorization or outcome given the input. The machine learning modules of the programs 106, 112, 116, 120, 132 and 152 may implement a machine learning technique such as decision tree learning, association rule learning, artificial neural network, inductive programming logic, support vector machines, Bayesian models, etc.

The arrows shown in FIGS. 1 and 2 between the components in the memory 104 represent a data flow between the components.

FIG. 2 illustrates an embodiment of a training computer system 200 in which the design machine learning module 120 is trained to produce output instances of graphical element types, e.g., icons 122, font/typeface 124, color composition 126, additional graphical element types 127, etc., based on input classifications from the text 108 such as sentiments 110, concepts, 114, entities 118, and additional classifications 119. In further embodiments additional instances of additional graphical element types may be outputted by the design machine learning module 120 and additional input classified from the text 108 may also be used to generate the output, including keywords, categories, and semantic roles.

The system 200 includes a training program 202 to train the design machine learning module 120 using input comprising graphical element training sets $300_1$, $300_2$ . . . $300_n$ that provide instances of graphical element types that should be outputted as graphical element output 204 for the input text classifications with a specified degree of confidence.

FIG. 300 illustrates an instance of a graphical element training set $300_i$ as including a classification 302 determined from the text 108, such as one or more of sentiments, tone, emotions, keywords, entities, categories, concepts, semantic role, etc.; an instance of the graphical element type 304 that should be outputted for the classification 302 with a specified confidence level 306.

The graphical element training sets $300_i$ may be based on design expertise that reflects appropriate instances of graphical elements for different classifications of text, such as sentiment, context, and entities. The mapping of instances of the graphical element types 304 is based on design choices that are appropriate for the content or classification 302 of the text 108 to be communicated. Typefaces may have appearances that express or a person associates with a tone or sentiment and concept. Different colors may also be associated with emotions. For instance, design expertise and design psychology may determine it is most appropriate to use the color red for context, tones and emotions comprising excitement, love, strength, energy. The color blue can be associated with trust, competence, intellect, etc. Further a set or grouping of color components can also be associated with different contexts, concepts, emotions etc. For instance, if the common colors used are blue, greys and green, then the design machine learning module 120 may recommend these color options for text 108 classified as having a healthcare context, concept or entity.

Further, certain types of images may be appropriate for different sentiments. The design machine learning module 120 may select a type of imagery style to the user, such as color or black and white photography, stock photo, illustration, clip art, line art, animation, etc., for different concepts and entities determined from the text 108 to render. For instance, if the text is part of an adult article, a photo may be more appropriate or if the body of text is part of a children's book, clip art may be more appropriate.

The design machine learning module 120 may further be trained to select a different set of icons for text based on its classified contexts or targeted users. For instance, different icons may be used to represent symbols for office workers than scientists, to select a set of iconography most familiar and appropriate to the context of the text.

The design machine learning module 120 may further be trained to select different formats to visually represent numbers presented in the text 108, such as whether to use a bar chart, graph, pie chart, etc. based on the context of the text 108 having numerical information. For instance, if the numerical information in the text 108 comprises numerical proportions, than a pie chart may be appropriate, if numerical information comprises categorical data, than a bar chart maybe considered or a line graph be used to compare changes over the same period of time.

Figure 4:
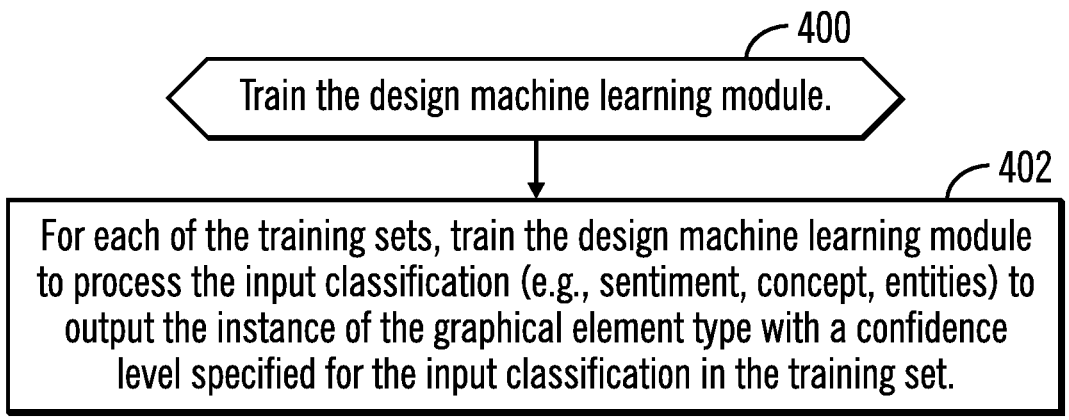
FIG. 4 illustrates an embodiment of operations to train the design learning module to determine instances of graphical element types used to render received text based on classifications of the text.

FIG. 4 illustrates an embodiment of operations performed by the training program 202 to train the design machine learning module 120. Upon initiating training operations (at block 400), the training program 202 trains (at block 402) the design machine learning module 402 for each of the training sets $300_1$, $300_2$ . . . $300_n$, to process the input classification 302 (e.g., sentiment, concept, entity, etc.) to output the instance of the graphical element type 304 with a confidence level 306.

With the operations of FIG. 4, the design machine learning module 120 is trained to produce appropriate instances of graphical elements for different classifications of the text 108 with specified confidence levels. Then during operations, the design machine learning module 120 may output different instances of graphical elements with different confidence levels for different values provided for the different types of classifications.

Figure 5B:
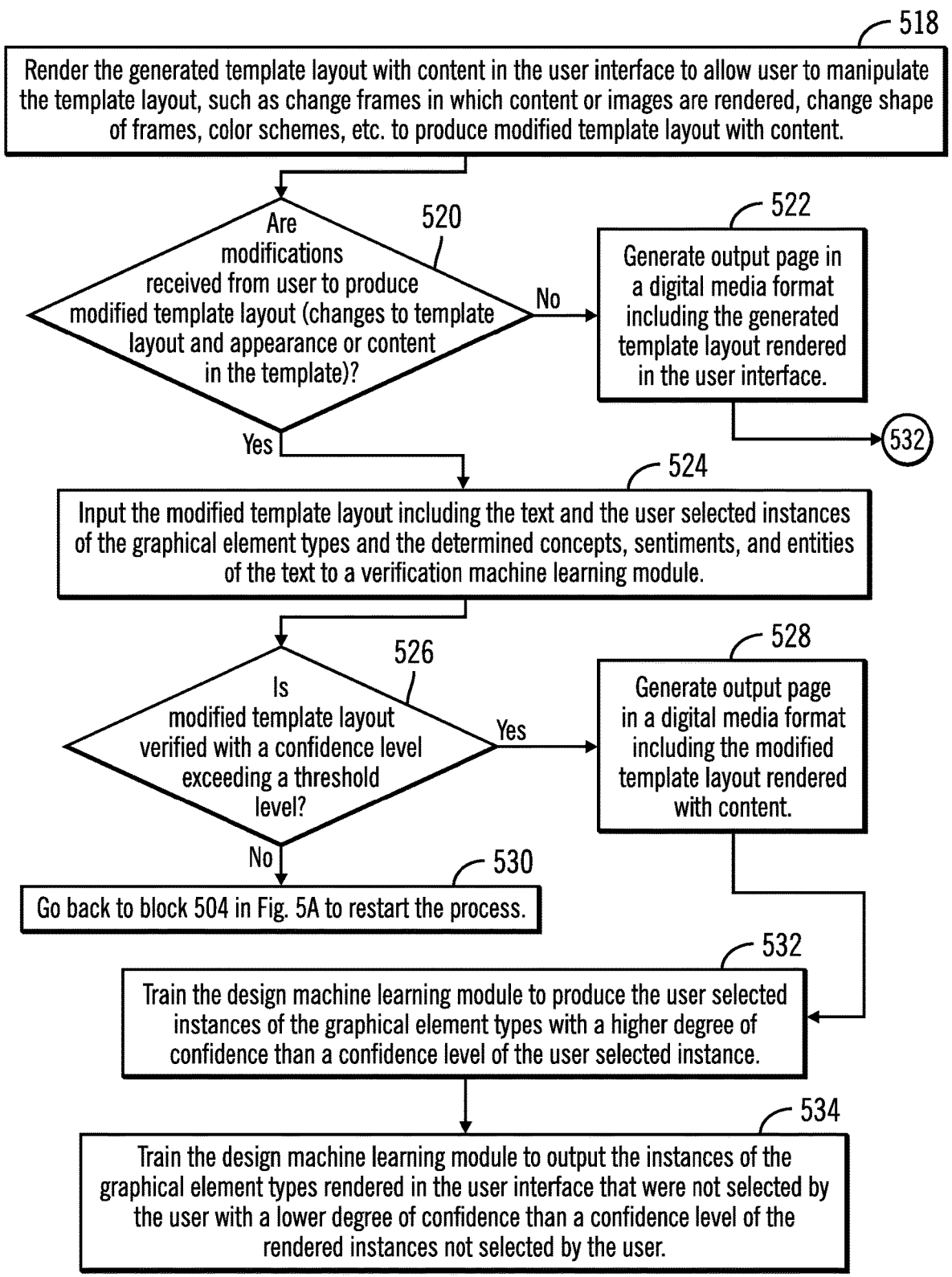

FIGS. 5A and 5B illustrate an embodiment of operations performed by the components of the template design program 105 to generate a template layout of content in which to render the input text 108, which may comprise a document of one or more paragraphs or a series of related documents to render in different frames of the output template layout 146. Upon receiving (at block 500) text 108 to include in a page in a digital media format, the template design program 105 inputs (at block 502) the text to at least one machine learning module, such as tone/sentiment classifier 106, natural language classifier 112, natural language processor 116, to classify the text 108 into sentiments 110, concepts 114, entities 118, and additional classifications 119 comprising other linguistically derived descriptors of the text 108, such as categories, semantic roles, keywords, etc. The template design program 105 inputs the classified sentiments 110, concepts 114, entities 118, and additional classifications 119 to the design machine learning module 120 to output a plurality of instances for each of a plurality graphical element types (e.g., icons 122, fonts/typefaces 124, color composition, 126, and additional graphical element types 127 (e.g., images, visual presentation of numerical data, etc.))

The template design program 105 determines (at block 506) a predetermined number of outputted instances 122, 124, 126, 127 for each of the graphical element types having highest confidence levels of the outputted instances for each of the graphical element types. The template design program 105 uses (at block 508) metadata describing the user selected instances of the graphical element types 130 to search a datastore 134 (local computer, design machine learning module provider, or remove server/web site) to determine the assets best matching the metadata describing the predetermined number of outputted instances 122, 124, 126, 127 with the highest confidence levels. The determined assets 136, 138, 140, 142 are rendered (at block 510) in the graphical element user interface output 128 in a format for the user to select the determined assets from the datastore 134 best matching the metadata. The graphical element user interface output 128, which may be displayed in a user display panel, receives (at block 512) the user selected instances of graphical element types 130 of the determined assets rendered in the graphical element user interface output 128. The user may further be prompted to select (at block 514) a template layout 144 in which to render the text 108 and determined instances 136, 138, 140, 142 of graphical element types 122, 124, 126, 127.

The accessed user selected instances of the accessed graphical element types 136, 138, 140, 142 and the selected template layout 144 are inputted (at block 516) to the layout generator 132 to render the text 108 in the selected font/typeface 124 and color composition 126 in the template layout 144 along with the user selected images, icons 122, visual representations of numerical data in text that may be rendered in the selected color composition, etc. At block 518 in FIG. 5B, the template design program 105 renders the generated template layout with content 146 in the template user interface output 148, which may be rendered in a user display panel, to allow the user to manipulate the template layout 144, such as change frames in which content or images are rendered, change shape and size of frames, color schemes, etc., to produce modified template layout with content 150.

If (at block 520) modifications are not received from the user for the template user interface output 148, then the final output layout 154 is generated (at block 522) in a digital media format including the generated template layout 146 rendered in the user interface. If (at block 520) there are modifications, then the modified template layout 150 including the text 108 and the user selected instances of the graphical element types 130 as well as the determined concepts 114, sentiments 110, and entities 118 of the text 108 are inputted (at block 524) to the verification machine learning module 152 to determine whether the modified template layout 150 is appropriate for the classifications 110, 114, 118 of the text 108. If (at block 526) the modified template layout 150 is verified with a confidence level exceeding a threshold, then the output layout 154 is generated (at block 528) in a digital media format including the modified template layout rendered with content 150 approved by the verification machine learning module 152. If (at block 526) the modified template layout 150 is not verified, then control returns to block 504 in FIG. 5A to restart the process.

After generating the final output layout at block 522 or 528, the template design program 105 may train (at block 532) the design machine learning module 120 to produce the user selected instances of the graphical element types with a higher degree of confidence than a confidence level of the user selected instances. This retraining reinforces the likelihood the design machine learning module 120 will output the user selected instances of the graphical element types in the graphical element user interface output 128 upon receiving similar classifications 110, 114, 118, 119 as input. The design machine learning module 120 may further be trained (at block 534) to output the instances of the graphical element types rendered in the user interface output 128 that were not selected by the user with a lower degree of confidence than a confidence level of the rendered instances in the graphical element user interface output 128 not selected by the user. This retraining reduces the likelihood the design machine learning module 120 will output the instances of the graphical element types the user did not select in the graphical element user interface output 128 upon receiving similar classifications 110, 114, 118, 119 as input.

The described embodiments provide the use of a design machine learning module 120 to receive as input different classifications of a text to select instances of graphical element types for the input classifications of the text 108 that is based on expert design selection and design principles, that specify the most appropriate designs and color schemes for different contexts of the input text 108 to properly convey the context, concepts, emotions and entities in the text through graphic design.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
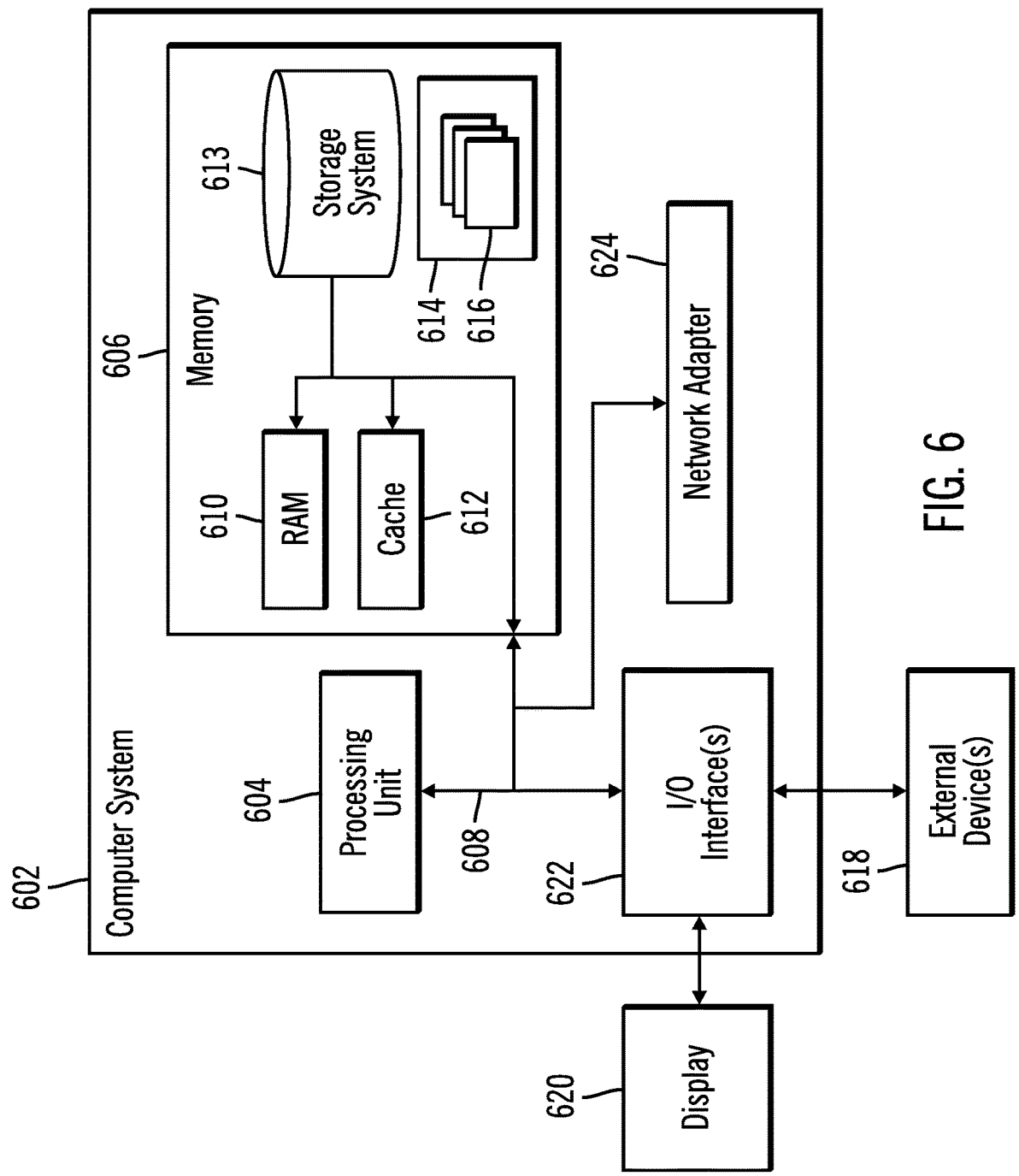
FIG. 6 illustrates an embodiment of a computer architecture used with described embodiments.

The computational components of FIGS. 1 and 2, including the systems 100 and 200, and all or some of the computational components 105, 106, 112, 116, 120, 132, and 152 may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The letter designators, such as i and n, used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining styling and appearance to render text in digital media, the computer program product comprising a computer readable storage medium having computer readable program code embodied therein that executes to perform operations, the operations comprising:
   processing attributes of text, with at least one machine learning classifier, to determine classifications of the text;
   inputting the determined classifications of the text to a machine learning module to output graphical element types;
   rendering, in a user interface, the outputted graphical element types for a user to select;
   receiving, by a layout generator, user selection of one of the graphical element types rendered in the user interface;
   rendering, by the layout generator, in a template layout, the text with the user selected graphical element type; and
   generating, in an output layout of digital media, the template layout including the text rendered with the user selected graphical element type.

2. The computer program product of claim 1, wherein the user selected graphical element type comprises a selected typeface in which to render the text, wherein the text is rendered in the template layout according to the selected typeface in which to render the text.

3. The computer program product of claim 1,
   wherein the graphical element types are members of a set of graphical element types comprising: typefaces in which to display the text; color composition in which to render elements in the template layout; images; icons; and a visual representation of numerical data included in the text, and
   wherein the classifications are members of a set of classifications comprising: sentiments, concepts, entities, tones, categories, keywords, and semantic roles.

4. The computer program product of claim 1, wherein the classifications comprise sentiments, concepts, and entities, wherein the processing the attributes of the text further comprises:
providing the text to a tone analyzer machine learning module to determine sentiments of the text;
providing the text to a natural language classifier to determine concepts for the text; and
providing the text to a natural language processing machine learning module to determine entities in the text.

5. The computer program product of claim 1, wherein the operations further comprise:
receiving user modification to a placement of the text and selected graphical element types rendered in the template layout to produce a modified template layout including the text and the user selected graphical element types, wherein the template layout comprises the modified template layout.

6. The computer program product of claim 5, wherein the operations further comprise:
inputting the modified template layout including the text and the user selected graphical element types and the determined classifications of the text to a verification machine learning module; and
outputting, by the verification machine learning module whether the modified template layout and content therein is appropriate for the determined classifications with a confidence level exceeding a threshold confidence level, wherein the modified template layout is generated in response to determining that the confidence level exceeds the threshold confidence level.

7. The computer program product of claim 1, wherein a confidence level is provided with each of the outputted graphical element types, wherein the operations further comprise:
determining a predetermined number of outputted graphical element types having highest confidence levels of the outputted graphical element types, wherein the rendered outputted graphical element types comprise the predetermined number of outputted graphical element types.

8. The computer program product of claim 1, wherein the operations further comprise:
providing training sets, wherein each training set provides as input a classification and as output a corresponding graphical element type with a confidence level, wherein the training sets comprise preselected design choices of graphical element types to use for different possible classifications of text with a confidence level indicating an appropriateness of the corresponding graphical element type for the input classification; and
for each of the training sets, training the machine learning module to output the corresponding graphical element type for the input classification with the confidence level provided in the training set.

9. The computer program product of claim 1, wherein the operations further comprising:
training the machine learning module to output the user selected graphical element types with higher degrees of confidence than confidence levels of the user selected graphical element types; and
training the machine learning module to output the graphical element types rendered in the user interface that were not selected by the user with lower degrees of confidence than confidence levels of the graphical element types selected by the user.

10. The computer program product of claim 1, wherein the operations further comprise:
using metadata describing the outputted graphical element types to search a datastore to access the graphical element types matching the metadata, wherein the outputted graphical element types rendered in the user interface for the user to select comprises the graphical element types accessed from the datastore.

11. A system for determining styling and appearance to render text in digital media, comprising:
a processor;
a machine learning module; and
a computer readable storage medium having computer readable program code embodied therein that executes to perform operations, the operations comprising:
processing attributes of text, with at least one machine learning classifier, to determine classifications of the text;
inputting the determined classifications of the text to the machine learning module to output graphical element types;
rendering, in a user interface, the outputted graphical element types for a user to select;
receiving, by a layout generator, user selection of one of the of the graphical element types rendered in the user interface;
rendering, by the layout generator, in a template layout the text with the user selected graphical element type; and
generating, in an output layout of digital media, the template layout including the text rendered with the user selected graphical element type.

12. The system of claim 11,
wherein the graphical element types are members of a set of graphical element types comprising: typefaces in which to display the text; color composition in which to render elements in the template layout; images; icons; and a visual representation of numerical data included in the text, and
wherein the classifications are members of a set of classifications comprising: sentiments, concepts, entities, tones, categories, keywords, and semantic roles.

13. The system of claim 11, wherein the operations further comprise:
receiving user modification to a placement of the text and selected graphical element types rendered in the template layout to produce a modified template layout including the text and the user selected graphical element types, wherein the template layout comprises the modified template layout.

14. The system of claim 11, wherein a confidence level is provided with each of the outputted graphical element types, wherein the operations further comprise:
determining a predetermined number of outputted graphical element types having highest confidence levels of the outputted graphical element types, wherein the rendered outputted graphical element types comprise the predetermined number of outputted graphical element types.

15. The system of claim 11, wherein the operations further comprise:
providing training sets, wherein each training set provides as input a classification and as output a corresponding graphical element type with a confidence level, wherein the training sets comprise preselected design choices of graphical element types to use for different possible classifications of text with a confidence level indicating an appropriateness of the corresponding graphical element type for the input classification; and for each of the training sets, training the machine learning module to output the corresponding graphical element type for the input classification with the confidence level provided in the training set.

16. A computer implemented method for determining styling and appearance to render text in digital media, comprising:

processing attributes of text, with at least one machine learning classifier, to determine classifications of the text;

inputting the determined classifications of the text to a machine learning module to output graphical element types;

rendering, in a user interface, the outputted graphical element types for a user to select;

receiving, by a layout generator, user selection of one of the graphical element types rendered in the user interface;

rendering, by the layout generator, in a template layout the text with the user selected graphical element type; and generating, in an output layout of digital media, the template layout including the text rendered with the user selected graphical element type.

17. The method of claim 16, wherein the graphical element types are members of a set of graphical element types comprising: typefaces in which to display the text; color composition in which to render elements in the template layout; images; icons; and a visual representation of numerical data included in the text, and wherein the classifications are members of a set of classifications comprising: sentiments, concepts, entities, tones, categories, keywords, and semantic roles.

18. The method of claim 16, further comprising:

receiving user modification to a placement of the text and selected graphical element types rendered in the template layout to produce a modified template layout including the text and the user selected graphical element types, wherein the template layout comprises the modified template layout.

19. The method of claim 16, wherein a confidence level is provided with each of the outputted graphical element types, further comprising:

determining a predetermined number of outputted graphical element types having highest confidence levels of the outputted graphical element types, wherein the rendered outputted graphical element types comprise the predetermined number of outputted graphical element types.

20. The method of claim 16, further comprising:

providing training sets, wherein each training set provides as input a classification and as output a corresponding graphical element type with a confidence level, wherein the training sets comprise preselected design choices of graphical element types to use for different possible classifications of text with a confidence level indicating an appropriateness of the corresponding graphical element type for the input classification; and for each of the training sets, training the machine learning module to output the corresponding graphical element type for the input classification with the confidence level provided in the training set.

* * * * *